July 26, 1932. H. KREIDEL 1,868,800
CENTRAL LUBRICATING DEVICE, ESPECIALLY FOR MOTOR DRIVEN VEHICLES
Filed Nov. 12, 1928
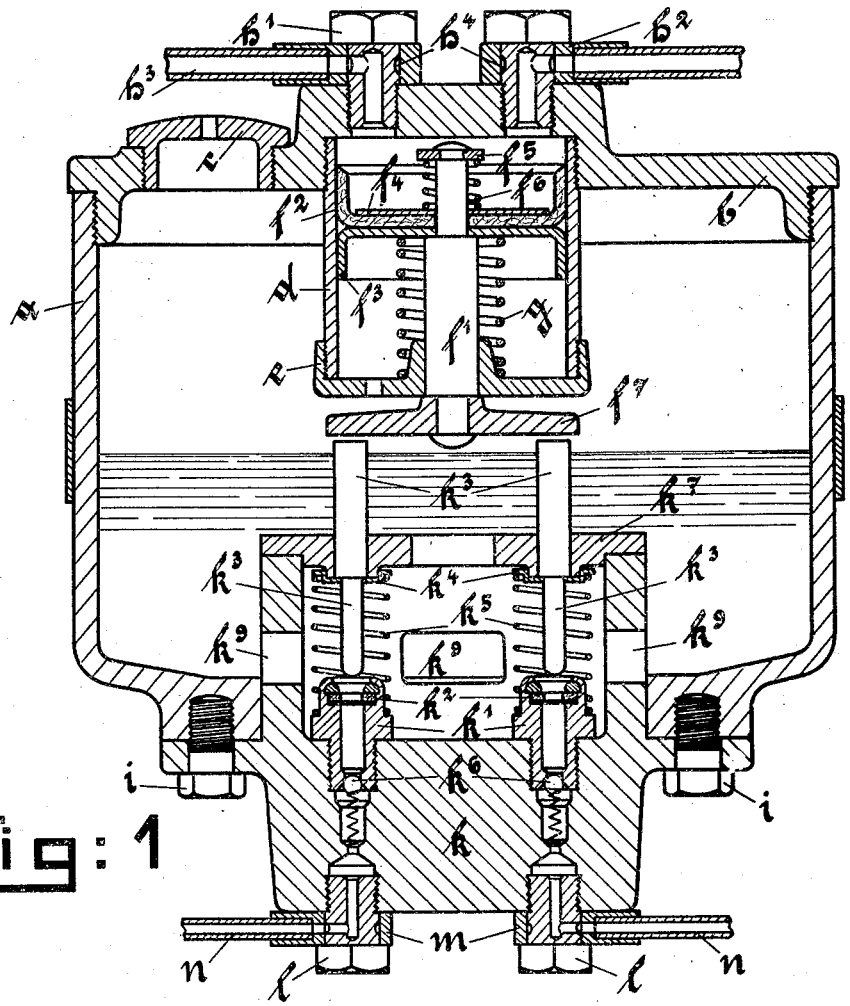
Fig: 1
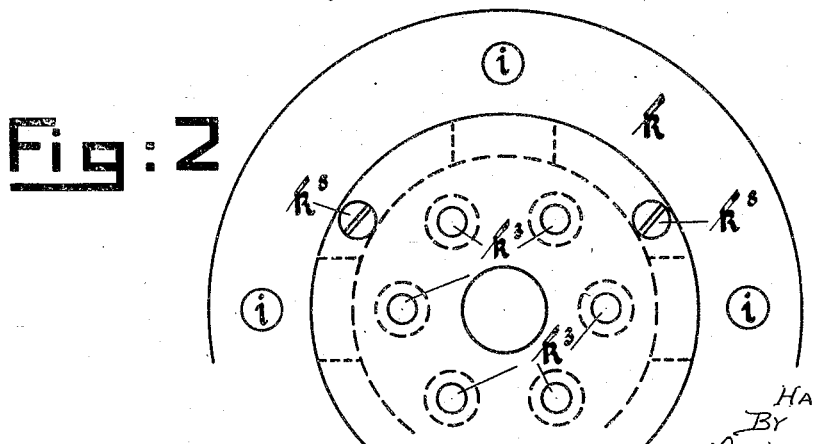
Fig: 2
INVENTOR
HANS KREIDEL
BY
ATTORNEYS.

Patented July 26, 1932

1,868,800

UNITED STATES PATENT OFFICE

HANS KREIDEL, OF WIESBADEN, GERMANY

CENTRAL LUBRICATING DEVICE, ESPECIALLY FOR MOTOR DRIVEN VEHICLES

Application filed November 12, 1928, Serial No. 318,688, and in Germany May 3, 1928.

The lubricating devices which are controlled from one point, whether they be used in connection with motor driven vehicles or for other purposes, all present a number of disadvantages. The pressure created by means of these devices is generally too low for ensuring an efficient lubrication of those constructional parts which have to bear high stresses and for pressing away foreign matter which may have been introduced between bearing parts during the process of working. Moreover, lubrication of the different parts is always dependent upon the proper working of the entire device so that in case of rupture of one part of the tubing the entire system ceases to perform its function. It is well known that defects of this kind (rupture of tubings and leakages) are generally only detected after considerable damage, requiring expensive repair work. Since the lubricant escapes at places where it finds the least resistance, it follows that tightly running bearings which especially require efficient lubrication are not lubricated at all, if for example, there should happen to be worn out parts in the immediate neighbourhood. Furthermore, as the resistances in the different tubings depend upon the length of the latter, it is impossible to feed a definite quantity of the lubricant to the parts to be lubricated. Especially in case of low outside temperatures, when the mineral oil which is used as a lubricant becomes very viscous, it may happen that those parts which are situated at a somewhat great distance receive no lubricant at all. The purpose of this invention is to overcome the aforementioned disadvantages.

The lubrication device controlled from one point in accordance with the present invention ensures a high degree of reliability by providing for each part to be lubricated a separate high pressure pump arrangement, which arrangements are combined in a single unit, are actuated together and are located within the receptacle containing the lubricant.

The quantity of the lubricant to be fed to the different parts by the high pressure pumps may be varied by differentiating the length of the pistons in accordance with the special requirements. The different parts are lubricated quite independently of one another and all mutual interference is avoided. It will prove to be an advantage if neighbouring parts to be lubricated are connected to a common central lubrication unit which is located in close neighbourhood as for example in the chassis of a motor car, so as to reduce the length of the tubings to the various parts as much as possible with a view of avoiding a reduction of pressure in the latter. The single high pressure pumps are arranged on a plane, one beside the other in a circle, and the pistons of the single pumps are actuated by a pressure plate which is operated by a piston moving in a separate low pressure cylinder. This low pressure cylinder is connected to a pressure or suction creating arrangement by the intermediary of a tubing containing an appropriate force transmitting liquid or gaseous means. The piston of the low pressure cylinder is normally maintained at one end of its stroke by a spring against which the force transmitting means has to apply its pressure. An appropriate dimensioning of the diameters of the pistons of the high pressure pumps makes it possible to obtain all required degrees of pressure in the tubings for feeding the lubricant to the different parts. All suitable fluids or gases such as glycerine, or air under greater or less than atmospheric pressure, may serve as a means for transmitting the actuating force to the piston of the low pressure cylinder. It will however be advantageous to choose a means, such, for example, as glycerine, which does not freeze even at the lowest outside temperatures which are liable to occur in actual service, so as to avoid the resistances in the tubings reaching such a degree as would be able to prevent an efficient working of the lubrication device. When choosing a transmitting of the force by pressure, it is desirable to avoid the use of valves in the pump or compressor arrangement and to provide a reaction spring for the purpose of reducing the pressure in the tubings as well as in the low pressure cylinder, as soon as the pressure creating arrangement is cut off or ceases to act. On arranging a plurality of these central lubricating devices, as for example will be necessary in connection with motor driven vehicles and the like, the tubing for the force transmitting means to the different low pressure cylinders is preferably carried out in an annular form with a view of ensuring a working of the device even if there should be need of exchanging one part of the tubing in case of the occurrence of defect and when there are no spare parts at hand.

The high pressure pump arrangement consists of a pressure cylinder screwed into the bottom of the receptacle containing the lubricant and of a plunger piston arranged and guided above the cylinder, which by means of a reaction spring is kept in its normal position outside the cylinder. In the tubing connecting the cylinder to the part to be lubricated a check valve is provided which opens towards the part to be lubricated as soon as the downward stroke of the piston in the cylinder creates a pressure which is sufficient to overcome the force of the valve spring. The lubricant is fed under high pressure to the parts to be lubricated. During the upward stroke of the piston, the check valve is closed under the action of the valve spring and a vacuum is created in the cylinder. As soon as the piston leaves the cylinder, the latter is automatically filled with a fresh quantity of the lubricant. The quantity of the lubricant which is fed to the parts to be lubricated is a function of the length of the downward stroke of the plunger piston and this quantity can easily be varied by the use of pistons of different length.

As an example of means for carrying the invention into practice, the accompanying drawing shows an embodiment of the device for six different parts to be lubricated.

Fig. 1 is a central vertical section of the central lubricating device with six commonly actuated high pressure pump arrangements, and Fig. 2 is a plan view of the pump assembly with the cover removed.

In the accompanying drawing $a$ is a receptacle containing the lubricant, $b$ its cover and $c$ a filling cap to be screw on to the cover and provided with a small air inlet opening. Screwed into the cover $b$ is the low pressure cylinder $d$ which is closed by means of an appropriate bottom cap $e$. The piston rod $f^1$ of an actuating piston is guided in the bottom cap $e$, the piston consisting of the leather cup $f^2$, the guiding part $f^3$, a large disc $f^4$, a smaller disc $f^5$ against which the spring $f^6$ abuts. The lower end of the piston rod carries a special pressure plate $f^7$. Between the tightly screwed on bottom cap $e$ and the guiding part $f^3$ a spring $g$ is provided which presses the actuating piston constantly upwards. Into the cover $b$ of the receptacle $a$ containing the lubricant are screwed the connecting screws $h^1$ which serve for tightly connecting the heads $h^2$ of the tubings $h^3$ for the force transmitting means to the low pressure cylinder $d$. The connecting screws $h^1$ have a passage and an annular groove $h^4$ so as to make it possible for the force transmitting means to gain access to the interior of the low pressure cylinder $d$. A special lower part $k$ is inserted from below into the receptacle containing the lubricant and fixed to it by means of four cap screws $i$ and in this lower part $k$ the different high pressure pump arrangements are fixed in a circular form. The high pressure pumps each consists of the pressure cylinder $k^1$ with packings $k^2$ arranged in the head of the cylinder which is given a greater diameter than its bottom the plunger piston $k^3$, the disc $k^4$ which serves as a rest for the spring, the spring $k^5$ and of the check non-return-valve $k^6$, the latter consisting of a sphere which is kept under the action of a spring. The plunger pistons $k^3$ are guided through the cover $k^7$ which is fixed to the lower part by means of three screws $k^8$. The wall of the lower part has passages $k^9$ through which the lubricant can flow from the receptacle $a$ to the pumps or to the cylinders of the pumps respectively. The lower part $k$ carries furthermore the connecting screws $l$ which serve for tightly connecting the heads $m$ of the high pressure tubings $n$. Also these connecting screws have passages and annular grooves which are in connection with the lubrication tubings.

The process of working is, on the assumption of the use of a force transmitting means under pressure, as for example glycerine, the following:

If by actuating an appropriate means (such as a pump, compressor or the like) from the driver's seat pressure is created in the tubings $h^3$, this pressure is transmitted through the connection screws $h^1$ to the piston of the low pressure cylinder $d$ and moves this latter downwardly against the action of the spring $g$, thereby causing the pressure plate $f^7$ to press on the heads of the plunger pistons $k^3$, thus driving them into the high pressure cylinders $k^1$. The lubricant which is contained in the pressure cylinder is caused by this pressure, the degree of which is dependent upon the difference in diameter of the two pistons to move through the check valve $k^6$ and the screws $l$ into the tubings $n$, sealing of the pistons $k^3$ in the cylinders $k^1$ being accomplished by means of packings $k^2$. As soon as the pressure on the force transmitting means in the tubing $h^3$ ceases, the piston of the low pressure cylinder returns to its initial position under the action of the spring $g$. By this procedure also the pressure on the plunger pistons $k^3$ ceases and these are driven out of their cylinders $k^1$ by means of the springs $k^5$, the closing of the check valves causing a partial vacuum in the cylinders. This partial vacuum causes a new quantity of the lubricant to flow into the cylinders so that the pumping arrangement is again ready for action. Owing to the fact that all parts to be lubricated are connected to the high pressure pump by separate tubings, independent lubrication of all parts is ensured, in spite of the pumps being together actuated by a common arrangement. The lubrication is independent not only as far as the process of lubrication is concerned but also as to the quantity of the lubricant which is fed to the different parts.

I claim as my invention:

1. In a combination pump and reservoir installation for centralized lubricating systems, the combination of a reservoir having openings at its top and bottom, a cover secured at the top of said reservoir, a cylinder associated with said top, a piston reciprocable within said cylinder, a spring tending to move said piston in one direction, a plate, a piston rod fixed to said plate and having lost motion connection with said piston, a bottom cap secured in the bottom opening of said reservoir, a plurality of cylinders supported in said cap, a plurality of plungers each guided for reciprocable movement in one of said cylinders, a spring associated with each of said plungers for withdrawing it from its cylinders, means for guiding said plungers while completely withdrawn from said cylinders stems formed integrally with said plungers and lying beneath said plate, and fluid pressure means for operating said piston, thereby to move said plate against said plunger stems and force said plungers into their respective cylinders to eject measured quantities of lubricant from said cylinders.

2. In a combination pump and reservoir installation for centralized lubricating systems, the combination of a reservoir having openings at its top and bottom, a cover secured at the top of said reservoir, a cylinder associated with said top, a piston reciprocable within said cylinder, a spring tending to move said piston in one direction, a plate operably connected to said piston, a bottom cap secured in the bottom opening of said reservoir, a plurality of cylinders supported in said cap, a plurality of plungers each mounted for reciprocable movement in one of said cylinders, a guide member for said plunger removably secured to said bottom cap for guiding said plunger when completely withdrawn from its cylinder, a spring associated with each of said plungers for withdrawing it from its cylinders, and fluid pressure means for operating said piston, thereby to move said plate against said plunger stems and force said plungers into their respective cylinders to eject measured quantities of lubricant from said cylinders.

3. In a combination pump and reservoir installation for centralized lubricating systems, the combination of a reservoir having openings at its top and bottom, a cover secured at the top of said reservoir, a motive cylinder carried by said top, a piston reciprocable within said cylinder, a spring tending to move said piston in one direction, a plunger actuating member reciprocated by said piston, a cap secured in the bottom opening of said reservoir, a plurality of cylinders supported in said cap, a plurality of plungers reciprocable into and out of said cylinders, a spring associated with each of said plungers for completely withdrawing it from its cylinders, means for guiding said pistons when completely withdrawn, stems formed integrally with said plungers and lying beneath said plunger actuating member, and fluid pressure means connected to said motive cylinder for operating said piston, thereby to move said member against said plunger stems and force said plungers into their respective cylinders to eject lubricant from said cylinders in different measured quantities, depending upon the lengths of said plungers.

4. In a reservoir and pump installation for centralized lubricating systems, the combination of a reservoir having an open bottom, a casting secured in position to close said opening, a plurality of cylinders removably secured in said casting, a plurality of reciprocable plungers, each of said plungers including a stem, a guide plate removably secured to said casting and having bores to receive and guide said stems when the plungers are completely removed from their cylinders, a spring associated with each of said plungers to move it entirely out of its associated cylinder, and check valved outlets for said cylinders secured in said casting and adapted to be connected to parts to be supplied with lubricant, said casting and guide plate together with the cylinder and plunger parts forming an assembly adapted to be attached to or removed from said reservoir as a unit.

5. In a reservoir and pump installation for centralized lubricating systems, the combination of a reservoir having an open bottom, an element secured in position to close said opening, a plurality of cylinders removably secured in said element, a plurality of reciprocable plungers of different lengths, each of said plungers having a stem, a guide plate secured to said element and having bores to guide said stems when the plungers are completely withdrawn from their cylinders, a spring abutting against each of said plunger stems to move its associated plunger entirely out of its cylinder, and check valved outlets for said cylinders secured to said casting and adapted to be connected to parts to be supplied with lubricant, said element and guide plate together with the cylinder and plunger parts forming an assembly adapted to be attached to or removed from said reservoir as a unit, and said plungers and stems being freely removable from said guide plate.

In testimony whereof I affixed my signature.

HANS KREIDEL.